(No Model.) 2 Sheets—Sheet 2.

G. MOORE & W. H. JOHNSON.
COMBINED PLOW AND DRILL.

No. 250,636. Patented Dec. 6, 1881.

Attest:
Saml. S. Boyd
Charles Pickles

Inventors:
Gilpin Moore
William H. Johnson
by C. D. Moody, atty.

UNITED STATES PATENT OFFICE.

GILPIN MOORE AND WILLIAM H. JOHNSON, OF MOLINE, ILLINOIS, ASSIGNORS TO DEERE & MANSUR COMPANY AND DEERE AND COMPANY, OF SAME PLACE.

COMBINED PLOW AND DRILL.

SPECIFICATION forming part of Letters Patent No. 250,636, dated December 6, 1881.

Application filed July 1, 1881. (No model.)

*To all whom it may concern:*

Be it known that we, GILPIN MOORE and WILLIAM H. JOHNSON, residents of Moline, Illinois, have made a new and useful Improvement in Combined Plows and Drills, of which the following is a full, clear, and exact description, reference being had to the annexed drawings, making part of this specification, in which—

Figure 1:
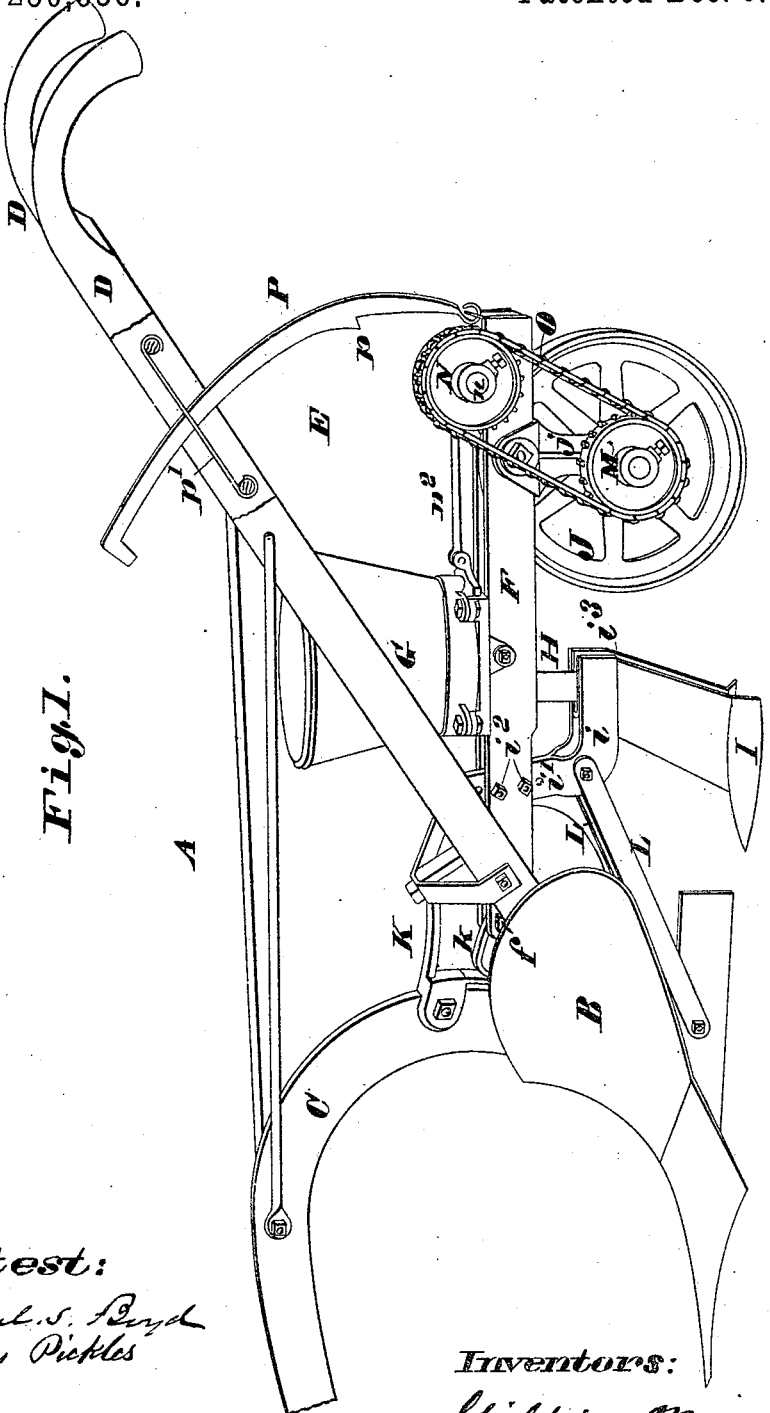
Figure 2:
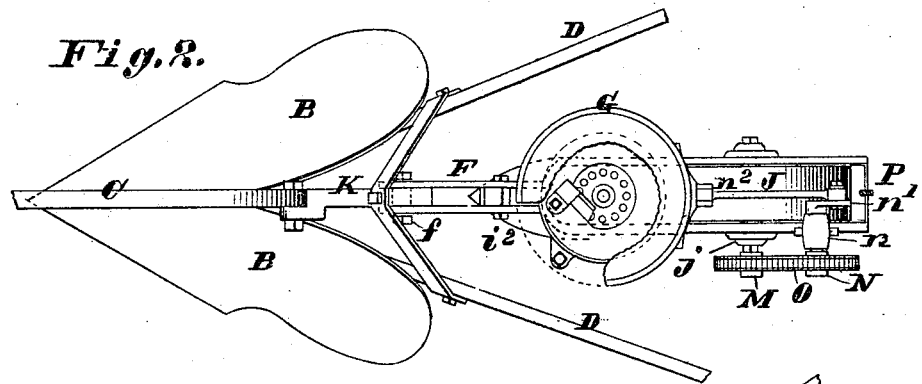
Figure 3:
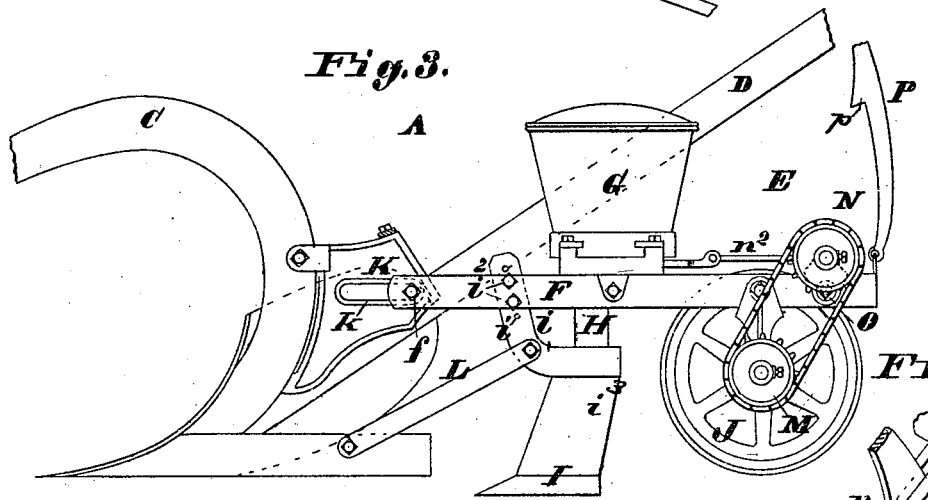
Figure 5:
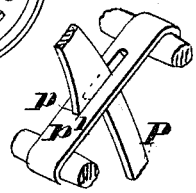
Figure 4:
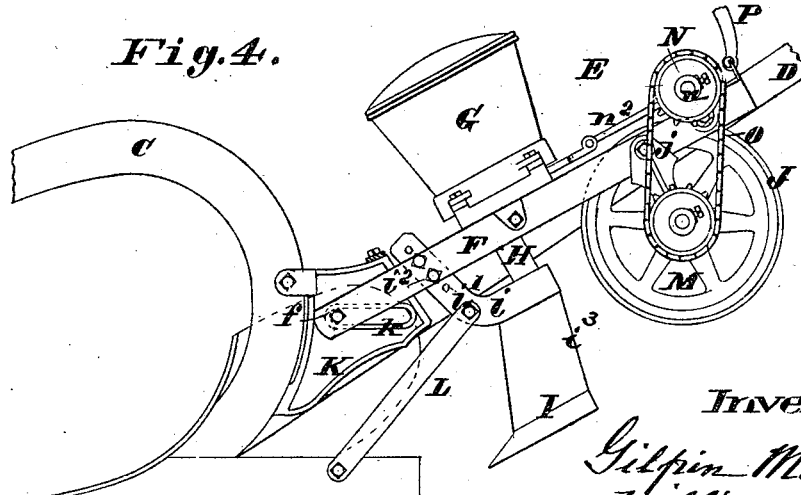

Figure 1 is a view, in perspective, of an implement having the improvement; Fig. 2, a plan, a portion of the seed-box being broken away; Fig. 3, a side elevation, the near mold-board being removed and the seeder resting on the ground; Fig. 4, a similar elevation, the seeder being raised; and Fig. 5, a detail showing the connection of the hook with the catch upon the plow-handles when the seeder is lifted from the ground.

The same letters denote the same parts.

The present invention is an improvement in that class of agricultural implements used for plowing and planting at a single operation, and more particularly in what is termed a "combined lister-plow and drill," the plow having a double mold-board and turning two furrows simultaneously, one to the right and the other to the left, the drill being arranged behind the plow, and having a spout in the form of or provided with a subsoil-shoe, and a driving and smoothing wheel being arranged in rear of the shoe.

The improvement mainly relates to the mode of connecting the drill and plow.

Referring to the drawings, A represents a plow having a double mold-board, B B, the beam C, and handles D D, substantially of the usual description.

E represents the drill attachment having the beam F, dropper G, spout H, subsoil-shoe I, and a smoothing and covering wheel, J, which also acts as a driver for the dropper mechanism.

The dropper, as well as the shoe and driving-wheel, may be of any approved style consistent with the main feature of the improvement—viz., the manner of uniting the plowing and the planting portions of the implement, and which is as follows: A plate, K, fastened to the plow-beam C, and practically forming a part or extension thereof, is slotted at $k$. A bolt, $f$, passes through the drill-beam F and the slot $k$, connecting the drill-beam, and all the fixtures immediately therewith associated, with the plow in such manner as to enable the plow and seeder to turn vertically upon each other, and so that the seeder shall be free of the oscillations of the plow.

Connections, preferably in the form of bars L L, extend at each side of the plow, from the plow at or near the base thereof backward and upward to the drill, uniting therewith at a point in rear of the bolt $f$, and preferably with the arm $i$, which supports the shoe I from the drill-beam, the connection of the bars L L at one or both ends thereof being jointed, to provide for the turning of the drill and plow upon each other and their independent oscillation, as described. The bars or straps L L serve not only to draw the drill, but, by reason of their leading from the plow upward to the drill-frame, also cause the subsoil-shoe to keep down and to run steadily in the ground at the depth to which the shoe is adjusted, for which last-named purpose the arm $i$ has a series, $i'$, of perforations, by means of which and the bolts $i^2$ $i^2$ the shoe can be set to run deeper or shallower, as desired. In practice the shoe is set to run from one and one-half to two and one-half inches deep. The shoe, including the standard $i^3$, is made open in the rear to answer as a tube to conduct the seed into the furrow made by the shoe.

The driving-wheel J turns in suitable bearings, $j$ $j$, connected with the beam F, and is furnished with a sprocket-wheel, M. Another sprocket-wheel, N, is journaled upon the drill-beam at $n$, and is supplied with a crank, $n'$, from which a pitman, $n^2$, leads to the dropper-mechanism. A chain, O, communicates the motion of the driving-wheel to the wheel N, and thence to the dropper.

P represents an arm jointed at its lower end to the drill-beam and extending thence upward, and having a hook, $p$. By raising the rear end of the drill-beam, or by depressing the plow-handles, the hook $p$ can be made to engage with a catch, $p'$, upon or connected with the plow-handles, and the drill mechanism thereby upheld from the ground, which is desirable in turning the implement at the ends of the rows, or whenever the operation of the drill is to be suspended.

The two positions of the drill are respectively shown in Figs. 3 and 4. In the former the drill is lowered, as in operation, and in the latter the drill is raised from the ground. So far as turning the drill and plow vertically upon each other is concerned the opening in the plate K need not be elongated into a slot, such as at $k$; but, in connection with the straps L L, the slot, if the drill-beam is connected with the plate K, becomes essential, and in that case a sliding fulcrum, in effect, is provided. On the other hand, by virtue of the straps L L being jointed to the plow, the drill and plow, in addition to the downward draft exerted by the straps upon the shoe I and also upon the driving-wheel, are connected in such a way as to enable one to turn vertically upon the other, and in such case the connection of the drill-beam in the slot $k$ aids in steadying the drill and operates to limit the movement of the drill both directly toward and from the plow and vertically. The two connections—the straps and the drill-beam in the slot $k$—are, however, especially valuable in combination. The two parts of the implement in operating upon level ground are practically rigidly united. At the same time hillocks and depressions can be passed without interrupting the proper working of either part of the implement. The plow can also oscillate sufficiently without affecting the working of the drill, and when the machine is not in operation either part can be turned upon the other. The weight of the driving-wheel and of the rear end of the drill can also, by means of the jointed connection of the drill with the plow, act as a lever to assist in holding the shoe and wheel down to the ground. A constant and steady pressure is produced upon the driving-wheel, the effect of which is to obtain an even and accurate movement of the seed-dropping mechanism.

We claim—

1. The combination of the plow A, having the double mold-board B B, the drill E, and straps L L, the latter being pivoted to the plow at the level of the lower part of the mold-board, and extending thence backward and upward to the point of connection with the drill, and the drill-beam being jointed to the plow at a point above the connection therewith of said straps.

2. The combination of a plow and drill, said plow and drill being connected by a jointed connection leading from the lower part of the mold-board of the plow backward and upward to the drill, at or near the drill-beam, which in turn is, at its forward end, jointed to the plow, for the purpose described.

3. The combination of the plow A and the drill E, connected by means of the drill-beam engaging in the plate K, and by means of the straps L L, leading from the lower part of the mold-board upward and backward to the drill, substantially as described.

4. The combination of the plow A, plate K, having the slot $k$, the drill-beam F, shoe I, arm $i$, and straps L L, said straps being jointed to the mold-board at or near the lower part thereof, and to the drill at or near the drill-beam, substantially as described.

5. A plow and drill, in combination, and connected as follows: A connection jointed to the plow at or near the base thereof, and extending thence backward and upward to the point of connection with the drill, and the drill-beam being jointed to or turning upon the plow at a point thereon above that of the connection first above named.

6. The combination of the plow A, drill-beam F, shoe I, arm $i$, perforations $i'$, and the straps L L, said drill-beam and straps both being jointed to said plow, substantially as described.

7. The combination of the plow A, straps L L, beam F, shoe I, and wheel J, said drill-beam and straps both being jointed to said plow, substantially as described.

8. A drill having a subsoil-shoe, I, and jointed loosely to a plow in front to enable both drill and shoe to be independent of the oscillations of plow.

GILPIN MOORE.
WILLIAM H. JOHNSON.

Witnesses:
W. J. ENTRIKIN,
J. T. BROWNING.